United States Patent
McNett et al.

Patent Number: 6,123,171
Date of Patent: *Sep. 26, 2000

[54] ACOUSTIC PANELS HAVING PLURAL DAMPING LAYERS

[76] Inventors: Christopher P. McNett; John C. McNett, both of 6160 N. Sherman Dr., Indianapolis, Ind. 46220

[*] Notice: This patent issued on a continued prosecution application filed under 37 CFR 1.53(d), and is subject to the twenty year patent term provisions of 35 U.S.C. 154(a)(2).

[21] Appl. No.: 09/256,864

[22] Filed: Feb. 24, 1999

[51] Int. Cl.$^7$ .................................................. E04B 1/82
[52] U.S. Cl. .................. 181/290; 181/286; 181/294; 181/290; 181/284; 181/207; 181/208; 181/288
[58] Field of Search .................. 181/286, 290, 181/294, 284, 207, 208, 288

[56] References Cited

U.S. PATENT DOCUMENTS

| | | | |
|---|---|---|---|
| 3,196,975 | 7/1965 | Voelker | 181/33 |
| 3,249,178 | 5/1966 | Watters | 181/33 |
| 3,265,154 | 8/1966 | March | 181/33 |
| 3,640,830 | 2/1972 | Oberst et al. | 161/165 |
| 4,315,971 | 2/1982 | Taylor et al. | 428/419 |
| 4,346,782 | 8/1982 | Bohm | 181/207 |
| 4,560,028 | 12/1985 | Perret | 181/288 |
| 4,663,224 | 5/1987 | Tabata et al. | 428/246 |
| 4,735,284 | 4/1988 | Gahlau et al. | 181/290 |
| 4,923,034 | 5/1990 | Okuzawa et al. | 181/207 |
| 4,926,963 | 5/1990 | Snyder | 181/290 |
| 4,940,112 | 7/1990 | O'Neill | 181/290 |
| 4,989,493 | 2/1991 | Blommer et al. | 89/36.02 |
| 5,400,296 | 3/1995 | Cushman et al. | 367/1 |
| 5,566,721 | 10/1996 | Breese | 138/145 |
| 5,712,038 | 1/1998 | Yamazaki et al. | 428/411.1 |
| 5,754,491 | 5/1998 | Cushman | 367/1 |

*Primary Examiner*—Paul Ip
*Assistant Examiner*—Edgardo San Martin
*Attorney, Agent, or Firm*—Woodard, Emhardt, Naughton Moriarty & McNett

[57] ABSTRACT

An acoustic panel having at least two compressible, flexible, acoustic foam damping layers separated by at least two rigid layers. In one preferred embodiment, a first rigid layer has a second flexible foam layer spray applied, with a further spray application of a rigid third layer, followed by a spray application of a flexible foam fourth layer, followed by a spray application of a rigid fifth layer, followed by a spray application of a sixth flexible foam layer, finally followed by a spray application of a rigid seventh layer. Sound transmission through this embodiment is especially well attenuated at high audio frequencies.

14 Claims, 1 Drawing Sheet

ACOUSTIC PANELS HAVING PLURAL DAMPING LAYERS

This invention relates to panels for sound absorption which have several layers to minimize transmission of sound through the panels. Such panels have application as sound barriers on aircraft and other motor vehicles to minimize engine noise and other outside noise reaching on-board passengers and crew, and as sound barriers in buildings to minimize noise reaching residents, tenants, and office workers from outside the room they occupy. Industry also has applications for improved acoustic panels to minimizing noise by using barriers to sound transmission in the work environment.

The prior art often sought to minimize sound transmission through panels by increasing the mass of the panel and constructing the panel with rigid materials which did not easily flex. Rules and regulations on permissible noise exposure have been established by the Occupation Safety and Health Act of 1970. Accordingly, the demand for sound attenuation means to reduce noise levels in various environments to an acceptable level has increased since these standards were established. Some such panels had a layer of fiberglass or acoustic foam to damp sound and convert some of the sound energy to heat. U.S. Pat. No. 3,196,975 discloses a flexible polyurethane foam having both open and closed cells, with examples of such foam being laminated to a preformed plastic facing sheet. The use of this layer of foam aids in sound absorption, but requires a relatively thick foam layer.

SUMMARY OF THE INVENTION

An acoustic panel for attenuating transmission of sound through the panel includes at least two first rigid layers, at least two flexible acoustic damping foam layers, with those layers being alternately placed so that a rigid layer is between both foam layers and a foam layer is between both rigid layers.

An object of the invention is to achieve improvements in sound absorption in sound transmitted through the panels, without substantial increases in cost or weight of the sound absorbing panels when compared to prior known designs. Another object is to achieve particularly good absorption of certain of the audio frequencies associated with gas turbine engines on jet aircraft. This can be accomplished by placing the panels along the interior surface of the fuselage of the aircraft, adjacent the passengers.

DESCRIPTION OF THE PREFERRED EMBODIMENT

Figure 1:
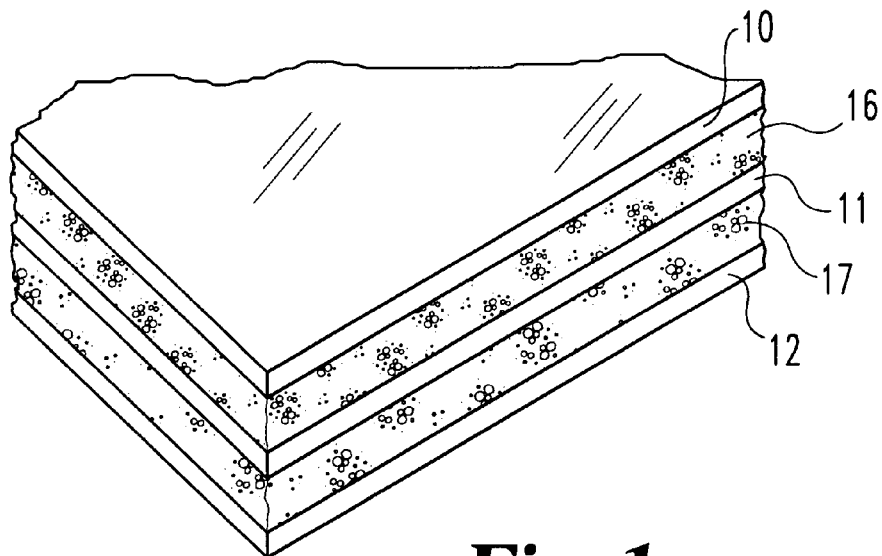
FIG. 1 illustrates applicant's panel invention by showing an approximately isometric perspective view of a corner section of a large rectangular panel having five layers.

Referring more particularly to FIG. 1, there is shown an acoustic panel incorporating the invention. As the term panel is used herein, it is not intended to be limited to a flat rectangular shape described in the preferred embodiment, but rather is intended to be such shape as fits the structure for which it is made. For example, the panel may be a cylindrical section placed on the inside of the fuselage of an aircraft.

The panel of the preferred embodiment of the invention as shown in FIG. 1 includes on its first side, a first first layer comprising a first acrylic plastic sheet 10, such as rigid 1/16 inch Plexiglas made by AtoHaas North America, Inc. Adjacent sheet 10 is a second layer of a first acoustic damping foam 16, such as 1/8 inch pink flexible product number C3002-12 manufactured by E-A-R Specialty Composites, Aearo Company, Indianapolis, Ind. 46268-1657. Adjacent the damping foam 16 on the side opposite sheet 10 is a third layer comprising a second acrylic plastic sheet 11, comparable to sheet 10. Similarly, adjacent plastic sheet 11 is a fourth layer of a second acoustic damping foam 17 comparable to foam 16. Further adjacent foam 17 is a fifth layer comprising a third acrylic plastic sheet 12, comparable to sheet 10 and which provides the second outer surface of the panel invention. Each layer may be securely coupled to its adjacent layer(s), such as by being bonded thereto with a suitable adhesive. For certain applications of the invention, it is preferred that each layer in the panel is less than 1/4 inch thick.

While there are mentioned in connection with this invention, specific dimensions, the invention is not necessarily limited to those specific dimensions, as thinner and thicker layers each provide certain advantages for certain applications. Certain applications of applicants' inventive concepts may involve numerous alternating foam and rigid solid layers, each of which may be very thin. Easily a dozen such thin layers could be adopted for certain applications of a panel product.

While an acrylic sheet has been identified as the preferred rigid, solid layer material to be used for the rigid layers, other rigid materials may be used. Examples of alternative materials are thin steel, or carbon fiber impregnated light weight plastics, or steel reinforced plastics, or fiberglass reinforced plastic, or titanium, or aluminum, or polycarbonates, or simply other rigid plastics formulated for rigidity, or the like. While the damping foam mentioned has a significant advantage of being flexible and containing compressible gas, and being designed as an acoustical damping foam, there are many other known damping materials, which may alternatively be used.

The plastic sheets 10–12 provide a rigid, relatively incompressible sound barrier having an acoustic impedance significantly different than the two separate intervening foam layers 16 and 17. The foam layers 16 and 17 are designed to provide substantial flexibility, compressibility, and damping to assist in absorbing transmitted sound and minimizing the coupling of the acoustic energy between layers. With suitable design, sound absorption, particularly in the 4 kHz to 10 kHz range, can be superior to alternative designs where the materials are not separated into the number and position of layers as described above.

Figure 2:
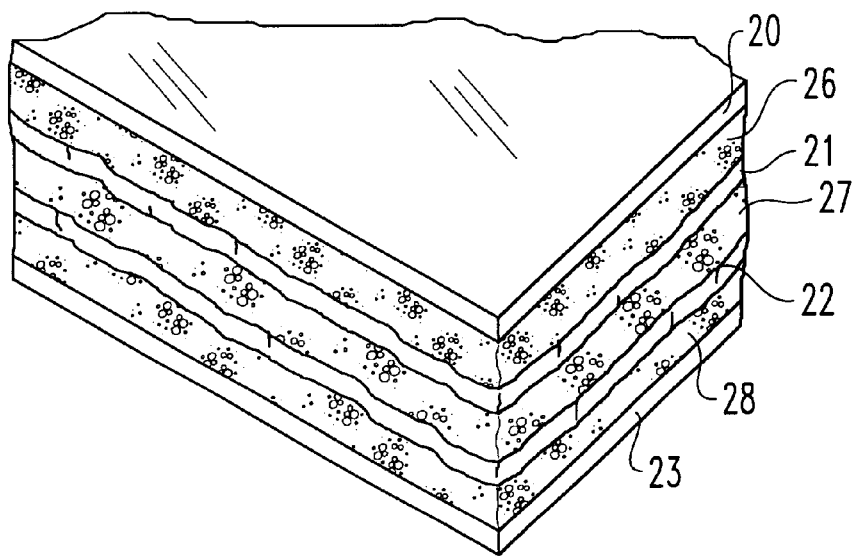
FIG. 2 illustrates a second embodiment of applicant's panel invention by showing an approximately isometric perspective view of a corner section of a large rectangular panel having seven layers, and in which the intermediate layers were applied by spraying.

Referring now to FIG. 2, there is illustrated a second embodiment of the invention, in which the intermediate layers were spray applied in conventional fashion. On a base 20 which constitutes a first rigid layer of acrylic plastic, a second layer of sprayed acoustic damping foam 26 is applied. As with the damping foam described above, this damping foam has voids containing compressible gas, and is made of material which is flexible and has the ability to absorb acoustic energy by damped flexing. While the invention is not limited to such, it is preferred that the foam has both open cells and closed cells in its construction. Next a third layer 21 of acrylic plastic is sprayed and allowed to harden to a rigid form, and a fourth layer of acoustic damping foam 27 is applied. Thereafter a fifth layer of rigid acrylic plastic is sprayed and allowed to harden to a rigid form, and a sixth layer of acoustic damping foam 28 is applied. Finally a seventh rigid layer of acrylic plastic is bonded to the exposed surface of the foam sixth layer.

When completed, this seven layer panel includes three separate acoustic foam layers 26–28 separated by and separating four rigid layers 20–23. As an alternative to spray forming the rigid layer on location, one can use conventional materials which can be applied in a flexible state and cured in place to become rigid. With this approach the layers may be sequentially applied and sequentially cured after application. Alternatively, a preassembled multiple layer flexible panel can be prepared in which all layers are simultaneously applied in a flexible state, with the rigid layers being cured to the rigid state after application, such as by thermal or radiation curing, or simply by a time-curing process which follows the preparation of the multilayered uncured panel shortly before installation. Depending upon the choice of layer materials, the use of conventional bonding agents between layers can be used to reduce the risk of delamination of the layers.

These alternating foam and rigid layer constructions provide numerous acoustic transitions between rigid solid and acoustic foam, with plenty of opportunity for the damping material to lower the levels of sound, and for the transitions between layers to reflect sound back through the damping material or toward the source of the sound.

While two types of rectangular sheets are illustrated to demonstrate our invention, it is to be understood that this is not intended to limit the invention. For example, curved rigid materials adapted to fit the contours of an aircraft fuselage or another motor vehicle wall, may alternatively be used as may be suitable for the situation. By using sprayed on layers, or layers which are cured to become rigid after application, any number and shape of contours of rigid layers may be alternated with foam layers.

What is claimed is:

1. An acoustic panel for attenuating transmission of sound through the panel, comprising:

a. at least two first rigid layers;

b. at least two compressible flexible acoustic damping foam layers; and c. said rigid and foam layers being alternately placed so that a rigid layer is between both foam layers and a foam layer is between both rigid layers.

2. The panel of claim 1 which additionally includes a third rigid layer.

3. The panel of claim 2 in which opposite sides of the panel are made of said rigid layers.

4. The panel of claim 2 which additionally includes a third foam layer and a fourth rigid layer.

5. The panel of claim 4 in which all three of the foam layers alternate in position with all of the four rigid layers, and positioned so that each one of the three foam layers is bounded by two rigid layers, one on each side.

6. The panel of claim 1 in which at least one rigid layer and one acoustic foam layer was spray applied.

7. The panel of claim 6 in which at least two rigid layers and at least two acoustic foam layers were spray applied.

8. The panel of claim 1 in which each layer is no greater than about ¼ inch.

9. The panel of claim 8 in which said two foam layers are no greater in thickness than about ⅛ inch.

10. The panel of claim 8 in which the rigid layers are no greater in thickness than about 1/16 inch.

11. The panel of claim 1 which forms a part of a motor vehicle and provides a sound barrier for passengers in the vehicle.

12. The panel of claim 11 which forms a part of the fuselage of an aircraft.

13. The panel of claim 1 in which the rigid layers are selected from the group consisting of thin steel, carbon fiber impregnated plastics, steel reinforced plastics, fiberglass reinforced plastic, titanium, aluminum, polycarbonates and acrylic plastic.

14. The panel of claim 13 in which the rigid layers are acrylic plastic.

* * * * *